US012349729B2

(12) United States Patent
Lu et al.

(10) Patent No.: US 12,349,729 B2
(45) Date of Patent: Jul. 8, 2025

(54) AEROSOL-GENERATING DEVICE AND INFRARED EMITTER

(71) Applicant: SHENZHEN FIRST UNION TECHNOLOGY CO., LTD., Guangdong (CN)

(72) Inventors: Linhai Lu, Shenzhen (CN); Ruilong Hu, Shenzhen (CN); Dongjun Yan, Shenzhen (CN); Wenjuan Li, Shenzhen (CN); Jian Wu, Shenzhen (CN); Zuqiang Qi, Shenzhen (CN); Baoling Lei, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 503 days.

(21) Appl. No.: 17/793,339

(22) PCT Filed: Jan. 15, 2021

(86) PCT No.: PCT/CN2021/072245
§ 371 (c)(1),
(2) Date: Jul. 15, 2022

(87) PCT Pub. No.: WO2021/143873
PCT Pub. Date: Jul. 22, 2021

(65) Prior Publication Data

US 2023/0055048 A1 Feb. 23, 2023

(30) Foreign Application Priority Data

Jan. 15, 2020 (CN) ........................ 202010041077.9

(51) Int. Cl.
*A24F 40/46* (2020.01)
*A24F 40/20* (2020.01)
*H05B 3/28* (2006.01)

(52) U.S. Cl.
CPC .............. *A24F 40/46* (2020.01); *A24F 40/20* (2020.01); *H05B 3/283* (2013.01)

(58) Field of Classification Search
None
See application file for complete search history.

(56) References Cited

U.S. PATENT DOCUMENTS

2008/0257367 A1 10/2008 Paterno et al.
2014/0338680 A1* 11/2014 Abramov ................ A24F 40/46 131/328

(Continued)

FOREIGN PATENT DOCUMENTS

CN 1633247 A 6/2005
CN 103763953 A 4/2014

(Continued)

OTHER PUBLICATIONS

Translation of CN 208925253 (Year: 2019).*

*Primary Examiner* — Cynthia Szewczyk
(74) *Attorney, Agent, or Firm* — Scully, Scott, Murphy & Presser, P.C.

(57) ABSTRACT

An aerosol-generating device comprises an infrared emitter and an electric core for supplying power to the infrared emitter, the infrared emitter comprises at least one first infrared emission region and at least one second infrared emission region arranged in sequence along the circumferential direction of the chamber; the first infrared emission region and the second infrared emission region are independently activatable to independently radiate infrared rays into the chamber to heat different portions of the smokable material. In the above aerosol-generating device, the regions (Continued)

of the smokable material receiving chamber which are different along the circumferential direction correspond to the first infrared emission region and the second infrared emission region, respectively, and can be independently heated by the first infrared emission region and the second infrared emission region, respectively, in use, so that the smokable material can be gradually heated from part to whole in use.

20 Claims, 7 Drawing Sheets

(56) References Cited

U.S. PATENT DOCUMENTS

| | | | | |
|---|---|---|---|---|
| 2016/0255879 | A1 | 9/2016 | Paprocki et al. | |
| 2020/0008469 | A1 * | 1/2020 | Reevell | H05B 3/44 |
| 2020/0008471 | A1 * | 1/2020 | Reevell | A24F 40/46 |

FOREIGN PATENT DOCUMENTS

| | | | |
|---|---|---|---|
| CN | 205305996 | U | 6/2016 |
| CN | 108338415 | A | 7/2018 |
| CN | 109068754 | A | 12/2018 |
| CN | 208925253 | U | 6/2019 |
| CN | 209120496 | U | 7/2019 |
| CN | 110384264 | A | 10/2019 |
| JP | H6-34272 | A | 2/1994 |
| JP | 2019-520043 | A | 7/2019 |
| JP | 2019-520044 | A | 7/2019 |
| WO | 2017/207435 | A1 | 12/2017 |

* cited by examiner

AEROSOL-GENERATING DEVICE AND INFRARED EMITTER

CROSS REFERENCE TO RELATED APPLICATIONS

This application is a 35 U.S.C. § 371 National Phase conversion of International (PCT) Patent Application No. PCT/CN2021/072245, filed on Jan. 15, 2021, which claims priority to Chinese Patent Application No. 202010041077.9, entitled "Aerosol-generating Device and Infrared Emitter", filed on Jan. 15, 2020, by China Patent Office, which is incorporated herein by reference in its entirety. The PCT International Patent Application was filed and published in Chinese.

TECHNICAL FIELD

Embodiments of the present invention relate to the field of heated non-combustible smoking appliances, and more particularly to an aerosol-generating device and an infrared emitter.

BACKGROUND

Smoking articles (e.g. cigarettes, cigars, etc.) burn tobacco during use to produce tobacco smoke. Attempts have been made to replace these tobacco-burning products by making products that release compounds without burning.

An example of such a product is a heating device that releases a compound by heating rather than burning a material. For example, the material may be tobacco or other non-tobacco products that may or may not contain nicotine. As another example, there are infrared heating devices that heat tobacco products by means of infrared ray to release compounds to form aerosols. As prior art, patent No. 201821350103.0 proposes a heating device structure in which a nano-far infrared coating and a conductive coating are successively formed on the outer surface of a quartz tube, and after the conductive coating is connected to a power supply for supplying power, the nano-far infrared coating generates heat by itself in the power supply, and forms an electronic transition to generate far infrared while generating heat, and radiates to a tobacco product in the quartz tube to heat the tobacco product. In use of the above known devices, the infrared emission coating completely surrounds the region of the tobacco product to be heated, so that the volatile substances of the tobacco product are released too quickly.

SUMMARY

To address the problem of heating devices of the prior art to release volatile substances from tobacco products too quickly, embodiments of the present invention provide an aerosol-generating device that can be heated stepwise.

Based on the above, the present invention provides an aerosol-generating device for heating a smokable material to generate an aerosol for inhalation, including:

a chamber for receiving a smokable material;

an infrared emitter configured to radiate infrared rays toward the chamber to heat the smokable material;

wherein the infrared emitter comprises at least one first infrared emission region and at least one second infrared emission region arranged in sequence along the circumferential direction of the chamber; the first infrared emission region and the second infrared emission region are configured to be independently activatable so as to independently radiate infrared rays to heat different portions of the smokable material.

In a more preferred embodiment, the at least one first infrared emission region and the at least one second infrared emission region may be controlled sequentially, and in particular may be activated alternately or at the same time, so as to independently radiate infrared rays to heat different parts of the smokable material. Also in an embodiment, the different infrared emission regions, e.g. the first infrared emission region and the second infrared emission region, may each be formed by two coatings or films bonded to the substrate in the circumferential direction, or by two portions of one coating or film formed on the substrate in the circumferential direction.

In a more preferred embodiment, the first infrared emission region and the second infrared emission region are separate from each other.

In a more preferred embodiment, the infrared emitter comprises:

a substrate extending in an axial direction of the chamber;

a first infrared emission layer and a second infrared emission layer successively bonded to the substrate surface along a circumferential direction of the chamber; and at least a portion of the first infrared emission layer forms the first infrared emission region and at least a portion of the second infrared emission layer forms the second infrared emission region.

In a more preferred embodiment, the substrate comprises a first surface close to the chamber and a second surface facing away from the chamber;

the first infrared emission layer and the second infrared emission layer are both located on the first surface or the second substrate surface.

In a more preferred embodiment, the first infrared emission layer is a coating formed on the substrate or a film bonded to the substrate;

and/or the second infrared emission layer is a coating formed on the substrate or a thin film bonded to the substrate.

In a more preferred embodiment, the substrate is configured as a tube extending in the axial direction of the chamber and surrounding the chamber; and the first infrared emission layer is a film wound on an outer surface of the substrate; and/or the second infrared emission layer is a film wound around the outer surface of the substrate.

In a more preferred embodiment, the first infrared emission layer and the second infrared emission layer do not completely cover the substrate surface, and a blank region between the first infrared emission layer and the second infrared emission layer in the circumferential direction of the chamber is formed on the substrate surface.

In a more preferred embodiment, the infrared emitter further comprises a conductive element for powering the first and second infrared emission layers.

In a more preferred embodiment, the conductive element is a conductive coating formed on the substrate.

In a more preferred embodiment, the conductive coating at least partially overlaps the first and second infrared emission layers, thereby forming a conductive connection with the first and second infrared emission layers.

In a more preferred embodiment, the conductive element is configured to extend in an axial direction of the chamber.

In a more preferred embodiment, the electrically conductive element comprises a first electrically conductive element, a second electrically conductive element and a third electrically conductive element arranged at intervals in the circumferential direction of the chamber;

the first infrared emission layer is coupled between the first conductive element and the second conductive element to radiate infrared rays toward the chamber when the first conductive element and the second conductive element are energized; and the second infrared emission layer is coupled between the second and third conductive elements to radiate infrared rays toward the chamber when the second and third conductive elements are energized.

In a more preferred embodiment, the conductive element is configured to extend in a circumferential direction of the chamber.

In an even more preferred embodiment, the electrically conductive element comprises a first electrically conductive element and a second electrically conductive element, and a third electrically conductive element and a fourth electrically conductive element, opposite in the axial direction of the chamber;

the first infrared emission layer is coupled between a first conductive element and a second conductive element in an axial direction of the chamber to radiate infrared rays toward the chamber when the first conductive element and the second conductive element are energized;

the second infrared emission layer is coupled between the third conductive element and the fourth conductive element in an axial direction of the chamber to radiate infrared rays toward the chamber when the third conductive element and the fourth conductive element are energized.

In a more preferred embodiment, the substrate comprises a first end and a second end opposite in the axial direction of the chamber; the conductive element is configured to extend in a circumferential direction of the chamber;

the conductive element comprises a first conductive element disposed at the first end, and a second conductive element and a third conductive element disposed at the second end;

the first conductive element includes a first portion opposite the second conductive element in an axial direction of the chamber, and a second portion opposite the third conductive element;

the first infrared emission layer is coupled between the first portion and the second conductive element in an axial direction of the chamber to radiate infrared rays toward the chamber when the first portion and the second conductive element are energized; and the second infrared emission layer is coupled between the second portion and the third conductive element in an axial direction of the chamber to radiate infrared rays toward the chamber when the second portion and the third conductive element are energized.

In a more preferred embodiment, the infrared emitter comprises:

a substrate extending in an axial direction of the chamber;

an infrared emission film bonded to the substrate surface;

the infrared emission film is formed with a first conductive coating, a second conductive coating and a third conductive coating extending along the axial direction of the chamber;

the first conductive coating, the second conductive coating and the third conductive coating are successively arranged along the circumferential direction of the chamber, so as to divide the infrared emission film into the first infrared emission region located between the first conductive coating and the second conductive coating and the second infrared emission region located between the second conductive coating and the third conductive coating.

In a more preferred embodiment, the infrared emitter comprises at least:

a first substrate and a second substrate disposed about the chamber;

the first substrate is provided with a first infrared emission layer, and the second substrate is provided with a second infrared emission layer; and at least a portion of the first infrared emission layer forms the first infrared emission region and at least a portion of the second infrared emission layer forms the second infrared emission region.

In a more preferred embodiment, the first substrate and/or the second substrate is configured as an arc that curves in a direction away from the chamber;

and/or the first substrate and/or the second substrate are configured as a sheet.

In a more preferred embodiment, the number of first emission regions and second emission regions are both two;

two of the first emission regions are oppositely arranged along the radial direction of the chamber; and two of the second emission regions are oppositely arranged in the radial direction of the chamber.

In a more preferred embodiment, the first infrared emission region and the second infrared emission region are configured to be activated alternately.

In a more preferred embodiment, further comprising a bridge circuit coupled to the first and second infrared emission regions;

the bridge circuit includes a transistor configured to alternately turn on and off to form a first current supplied alternately to a first emitting region and a second current supplied alternately to a second emitting region to alternately activate the first and second infrared emission regions.

In a more preferred embodiment, the first infrared emission region and the second infrared emission region have different infrared emission spectra.

In a more preferred embodiment, the infrared emission spectrum of the first infrared emission region has a different peak wavelength than the infrared emission spectrum of the second infrared emission region.

The present invention further provides an infrared emitter for an aerosol-generating device comprising:

a first infrared emission region and a second infrared emission region arranged in sequence along a circumferential direction; wherein the first and second infrared emission regions are configured to be independently activatable to independently radiate infrared rays to heat different portions of the smokable material.

In the above aerosol-generating device, the regions of the smokable material receiving chamber which are different along the circumferential direction correspond to the first infrared emission region and the second infrared emission region, respectively, and can be independently heated by the first infrared emission region and the second infrared emission region, respectively, in use, so that the smokable material can be gradually heated from part to whole in use.

BRIEF DESCRIPTION OF THE DRAWINGS

One or more embodiments are illustrated by way of example and not by way of limitation in the Figs. of the accompanying drawings, in which elements having the same reference numeral designations represent similar elements, and in which the Figs. are not to scale unless otherwise specified.

DETAILED DESCRIPTION

In order that the invention may be readily understood, a more particular description of the invention will be rendered by reference to the appended drawings and detailed description.

One embodiment of the present invention is directed to an aerosol-generating device that heats rather than combusts a smokable material, such as a cigarette, thereby volatilizing or releasing at least one component of the smokable material to form an aerosol for inhalation.

According to a preferred embodiment, the heating of the smokable material by the aerosol-generating device is performed by irradiating far infrared rays having a heating effect; for example, in the case of far infrared ray having a wavelength in the range of 3 μm to 15 μm, when the wavelength of the infrared ray matches the absorption wavelength of the volatile component of the smokable material in use, the energy of the infrared ray is readily absorbed by the smokable material and the smokable material is heated to volatilize at least one of the volatile components to produce an aerosol for inhalation.

Figure 1:
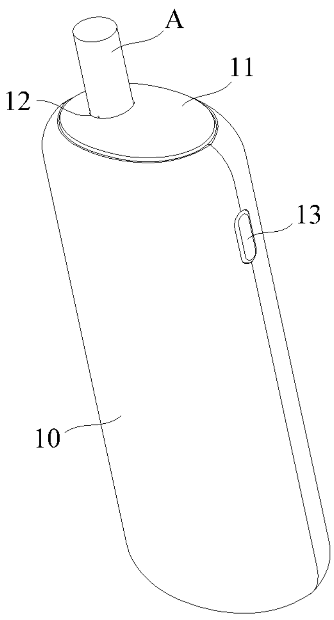
FIG. 1 is a schematic view of an aerosol-generating device provided according to one embodiment.
Figure 2:
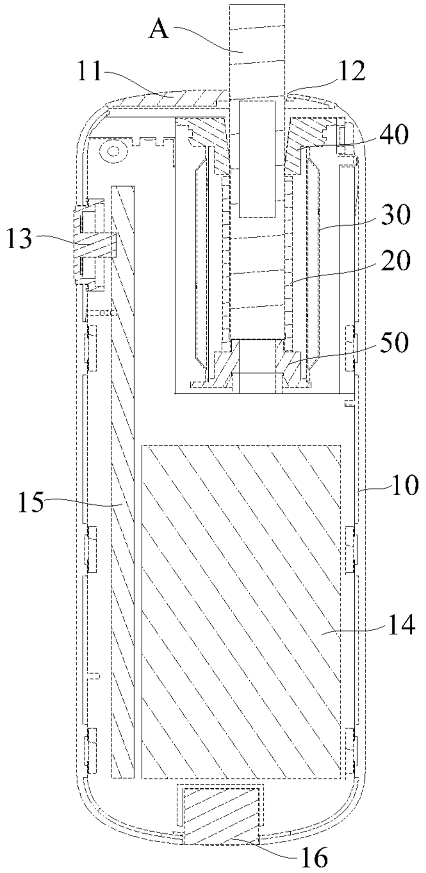
FIG. 2 is a cross-sectional view of the aerosol-generating device of FIG. 1.

The configuration of an aerosol-generating device according to an embodiment of the present invention can be seen in FIGS. 1 to 2. The outer shape of the device is generally configured in the shape of a flat cylinder. The outer member of the aerosol-generating device comprises:

- a housing 10, the interior of which is of a hollow structure, thereby forming an assembly space which can be used for necessary functional components such as infrared ray;
- an upper cover 11 located at an upper end portion of the housing 10 in the length direction; on the one hand, the upper cover 11 can cover the upper end of the housing 10 to make the appearance of the aerosol-generating device complete and beautiful; on the other hand, it can be detached from the upper end portion of the housing 10, thereby facilitating the installation and removal replacement of each functional component in the housing 10.

As can further be seen in FIGS. 1 and 2, the upper cover 11 has an opening 12 through which the smokable material A may be at least partially received within the housing 10 along its length direction to be heated or may be removed from the housing 10.

The housing 10 is further provided with a switch button 13 along one side in the width direction, which can be manually actuated by a user to control the operation of the aerosol-generating device to start or stop.

Further, in FIG. 2, the housing 10 is provided with:

- a power supply electric core 14;
- a control circuit board 15 integrated with a circuit for controlling the operation of the aerosol-generating device;
- a charging interface 16, such as a USB type-C interface, a Pin pin interface, or the like, for charging the electric core 14 may charge the electric core 14 after being connected to an external power source or adapter.

With further reference to FIG. 2, in order to effect heating of the smokable material A, an infrared emitter 20 is provided within the housing 10; the infrared emitter 20 is an electro-active infrared emitter for radiating infrared ray into the smokable material A received in the housing 10 to heat the smokable material A when the electric core 14 is powered.

In the preferred embodiment shown in FIG. 2, the aerosol-generating device further includes a heat insulator 30 disposed outwardly of the infrared emitter 20 along the radial direction. In a more preferred embodiment, heat insulator 30 is a vacuum insulated pipe or the like that includes an internal vacuum region.

Further, in FIG. 2, the aerosol-generating device further comprises an upper support 40 and a lower support 50 each having a hollow annular shape; support is provided to both ends of the infrared emitter 20 and the heat insulator 30, respectively, so that the infrared emitter 20 and the heat insulator 30 are stably held in the housing 10.

In a more preferred embodiment, the infrared emitter 20 has different infrared emission regions arranged in a circumferential direction to independently emit infrared ray into the smokable material A to heat different regions of the smokable material A. The infrared emitters 20 have different infrared emission regions arranged in a circumferential direction and may be controlled sequentially, activated alternately or activated simultaneously, each independently heating a different portion of the smokable material A. Also, in an embodiment, the different infrared emission regions may be formed by each of two coatings or films formed on the substrate in the circumferential direction, or by one coating or film formed on the substrate being separated in the circumferential direction by a conductive coating.

Specifically, the infrared emitter 20 is a tubular shape extending along a length direction, and the infrared emitter 20 comprises at least one first infrared emission region and at least one second infrared emission region arranged in sequence along a circumferential direction; the first infrared emission region and the second infrared emission region are separate from one another, the first infrared emission region and the second infrared emission region being configured to be independently activatable so as to independently radiate infrared rays into the chamber to heat different portions of the smokable material.

Figure 3:
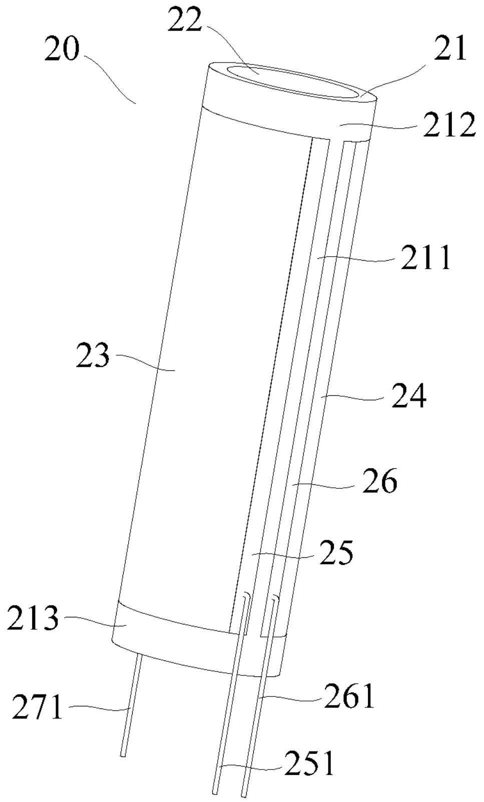
FIG. 3 is a schematic view of one embodiment of the infrared emitter of FIG. 2.

In particular, in the preferred embodiment shown in FIG. 3, the aerosol-generating device comprises a chamber 22 for receiving the smokable material, the infrared emitter 20 being configured to radiate infrared rays into the chamber 22 to heat the smokable material.

The infrared emitter 20 includes:

a substrate 21, the substrate 21 being a tubular hollow structure, the substrate 21 serving as a rigid carrier and an object containing a smokable material A, and being made of a high-temperature-resistant and infrared-transparent material such as quartz glass, ceramic or mica in an embodiment; a transparent material is preferred, such as a high temperature resistant material with an infrared ray transmittance of 95% or more; in use the matrix 21 is configured to extend axially of and around the periphery of the chamber 22, i.e. at least a portion of the tubular hollow of the matrix 21 forms the chamber 22 for receiving the smokable material A; wherein the substrate 21 comprises an outer surface and an inner surface, wherein the outer surface of the substrate 21 is a substrate surface 21 facing away from the cavity 22, and the inner surface of the substrate 21 is a substrate surface 21*a* close to the cavity 22; and a first infrared emission coating 23 and a second infrared emission coating 24 which are formed on the outer surface of the substrate 21 and are sequentially arranged along the circumferential direction; in use, the first infrared emission coating 23, and the second infrared emission coating 24, when energized, are capable of heating themselves and radiating infrared ray having a wavelength that can be used to heat the smokable material A, such as the above 3 mum to 15 mum far infrared. When the wavelength of the infrared ray matches the absorption wavelength of the volatile component of the smokable material A, the energy of the infrared ray is readily absorbed by the smokable material A.

At least a portion of the first infrared emission coating 23 forms a first infrared emission region and at least a portion of the second infrared emission coating 24 forms a second infrared emission region. The first infrared emission coating 23 is a coating formed on the substrate or a thin film bonded to the substrate, and the second infrared emission coating 24 is a coating formed on the substrate or a thin film bonded to the substrate.

Generally, the first infrared emission coating 23 and the second infrared emission coating 24 may be applied as a coating including ceramic-based materials such as zirconium, or Fe—Mn—Cu-based, tungsten-based, or transition metals and their oxides.

In a preferred embodiment, the first infrared emission coating 23 and the second infrared emission coating 24 are preferably composed of oxides of at least one metal element such as Mg, Al, Ti, Zr, Mn, Fe, Co, Ni, Cu, Cr, Zn, etc., which radiate far infrared rays having a heating effect when heated to an appropriate temperature; the coating thickness can be controlled preferably from 30 μm to 50 μm; the method for forming on the substrate surface 21 can be obtained by spraying the oxide of the above metal element on the outer surface of the substrate 21 by means of atmospheric plasma spraying and then solidifying.

According further to the preferred embodiment shown in FIG. 3, the outer surface of the substrate 21 is not completely covered by the first infrared emission coating 23 and the second infrared emission coating 24, and has on the outer surface a first blank region 211 located between the first infrared emission coating 23 and the second infrared emission coating 24 and extending in the axial direction, a second blank region 212 near the upper end, and a third blank region 213 near the lower end. Here, the upper and lower ends refer to both ends of the substrate body 21 in the axial direction thereof, respectively.

In use, the first blank region 211, the second blank region 212 and the third blank region 213 are spaces for the infrared emitter 20 to mate with a fixing and holding structure in the housing 10 or to subsequently re-solder a lead wire or the like on the substrate surface body 21, so as to prevent the printed infrared emission coating from causing abrasion or the like during assembling or disassembling operations or the like after printing the infrared emission coating. Further, the first blank region 211 serves to separate the first infrared emission coating 23 from the second infrared emission coating 24.

The infrared emitter 20 further comprises a conductive element for powering the first and second infrared emission coatings 23, 24, which in the embodiment of the present application is a conductive coating formed on the substrate 21. The conductive coating at least partially overlaps the first infrared emission layer and the second infrared emission layer, thereby electrically connecting the first infrared emission layer and the second infrared emission layer. It will be appreciated that in some other embodiments, the conductive elements may also be conductive films overlying the surface of substrate 21, conductive pins, or conductive instruments formed of other structures, without limitation.

The conductive element comprises a first conductive element, a second conductive element and a third conductive element which are arranged at intervals along the circumferential direction of the chamber, wherein each of the first conductive element, the second conductive element and the third conductive element can be a structure of any one of conductive coatings, conductive films, conductive pins or conductive instruments of other structures, or alternatively, each of the first conductive element, the second conductive element and the third conductive element can be a structure formed by combining a plurality of conductive coatings, conductive films, conductive pins or conductive instruments of other structures. In embodiments of the present application, the first conductive element is described by way of example as a first conductive coating, the second conductive element is described by way of example as a second conductive coating, and the third conductive element is described by way of example as a third conductive coating.

The conductive coating extends in the axial direction of the chamber 22. The conductive coating is formed on the substrate 21, and the conductive coating at least partially overlaps the first infrared emission coating 23 and the second infrared emission coating 24, thereby forming a conductive connection with the first infrared emission coating 23 and the second infrared emission coating 24.

The conductive coating comprises a first conductive coating 25 and a second conductive coating 26 formed on the substrate 21 by means of printing or coating, etc.; these conductive coatings are used as electrodes for powering the infrared emitters 20, which are subsequently interfaced to power regions of the infrared emitters 20 after being connected to the positive and negative poles of the electric core 14. Specifically, as shown in FIG. 3, the first conductive coating 25 and the second conductive coating 26 each extend in the axial direction, and a certain distance is maintained between the first conductive coating 25 and the second conductive coating 26 in the circumferential direction, and the first blank region 211 is formed by the distance.

Also in use, at least a portion of the first conductive coating 25 partially overlaps the first infrared emission coating 23 to form an electrical conductor, and at least a portion of the second conductive coating 26 partially overlaps the second infrared emission coating 24 to form an electrical conductor.

Figure 4:
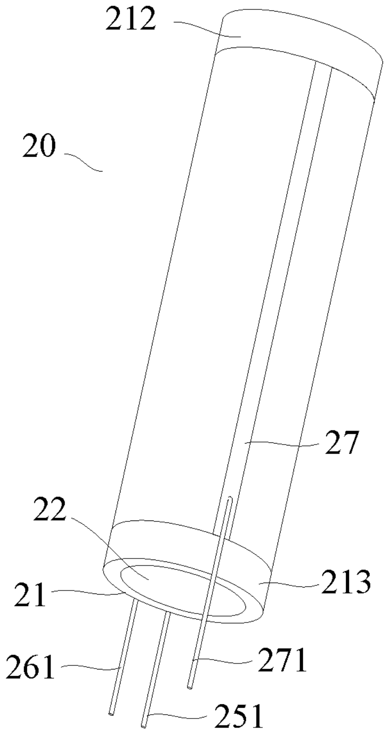
FIG. 4 is a schematic view of the infrared emitter of FIG. 3 from yet another perspective.

With reference to a schematic view from another perspective as shown in FIG. 4, the infrared emitter 20 further comprises a third conductive coating 27 extending in the axial direction, and the third conductive coating 27 is partially overlapped with the first infrared emission coating 23 and the second infrared emission coating 24 at the same time so as to be conductively connected; then, in use, the first conductive coating 25 and the third conductive coating 27 are respectively formed at two side ends of the first infrared emission coating 23 along the circumferential direction and are conductive, so as to be respectively connected to the positive and negative electrodes of the electric core 14, thereby supplying power to the first infrared emission coating 23 so as to radiate infrared rays. Similarly, a second conductive coating 26 and a third conductive coating 27 are respectively formed on the two side ends of the second infrared emission coating 24 along the circumferential direction and are conductive, so as to be respectively connected to the positive and negative electrodes of the electric core 14, thereby supplying power to the second infrared emission coating 24 so as to radiate infrared rays.

Specifically, a first conductive coating 25, a second conductive coating 26, and a third conductive coating 27 are respectively arranged at intervals along the circumferential direction of the chamber; the first infrared emission coating 23 is coupled between the first conductive coating 25 and the third conductive coating 27 to radiate infrared rays to the chamber when the first conductive coating 25 and the third conductive coating 27 are energized; the second infrared emission coating 24 is coupled between the second conductive coating 26 and the third conductive coating 27 to radiate infrared rays toward the chamber when the second conductive coating 26 and the third conductive coating 27 are energized.

Materially, the first conductive coating 25, the second conductive coating 26 and the third conductive coating 27 are made of a low-resistivity metal or alloy, such as silver, gold, palladium, platinum, copper, nickel, molybdenum, tungsten, niobium or the above-mentioned metal alloy material.

Further, in the preferred embodiment shown in FIGS. 3 and 4, the first conductive coating 25, the second conductive coating 26 and the third conductive coating 27 are respectively provided with a first conductive pin 251, a second conductive pin 261 and a third conductive pin 271 which are connected to be conductive by welding or the like, and the first conductive coating 25, the second conductive coating 26 and the third conductive coating 27 are respectively connected to the electrode of the electric core 14 via these conductive pins.

According to the above, the first and second infrared emission coatings 23, 24 may in use be powered independently of each other to radiate infrared rays independently or simultaneously to heat a portion region or the whole of the smokable material A.

Figure 5:
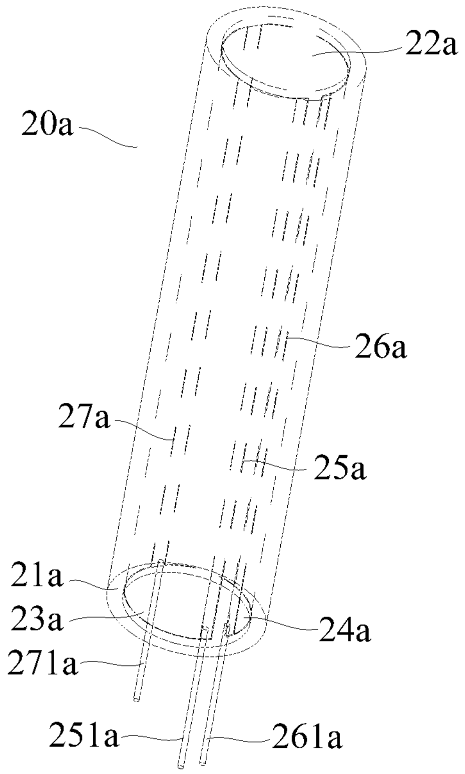
FIG. 5 is a schematic view of yet another embodiment of the infrared emitter of FIG. 2.

In yet another embodiment, the infrared emitter **20*a* shown with reference to FIG. 5** comprises:

- a substrate **21*a* having a tubular hollow structure, at least a portion of the tubular hollow of the substrate 21*a* forming a chamber 22*a* for receiving the smokable material A; wherein the substrate 21*a* comprises an outer surface and an inner surface, wherein the outer surface of the substrate 21*a* is a substrate surface 21 facing away from the chamber 22, and the inner surface of the substrate 21*a* is a substrate surface 21*a* close to the chamber 22**; and
- a first infrared emission coating **23*a* and a second infrared emission coating 24*a* formed on the inner surface of the substrate 21*a*** and arranged in sequence along the circumferential direction;
- further, in order to facilitate the independent power supply of the first infrared emission coating **23*a* and the second infrared emission coating 24*a*, the inner surface of the substrate 21*a* also has a first conductive coating 25*a*, and a second conductive coating 26*a*, and a third conductive coating 27*a* extending in the axial direction; according further to what is shown in FIG. 5, the first conductive coating 25*a* and the third conductive coating 27*a* are respectively arranged at two side ends of the first infrared emission coating 23*a* along the circumferential direction so as to supply power to the first infrared emission coating 23*a*, and the second conductive coating 26*a* and the third conductive coating 27*a* are respectively arranged at two side ends of the second infrared emission coating 24*a* along the circumferential direction so as to supply power to the second infrared emission coating 24*a*. Of course, the first conductive coating 25*a* and the second conductive coating 26*a*** are spaced apart by a certain distance.

Figure 6:
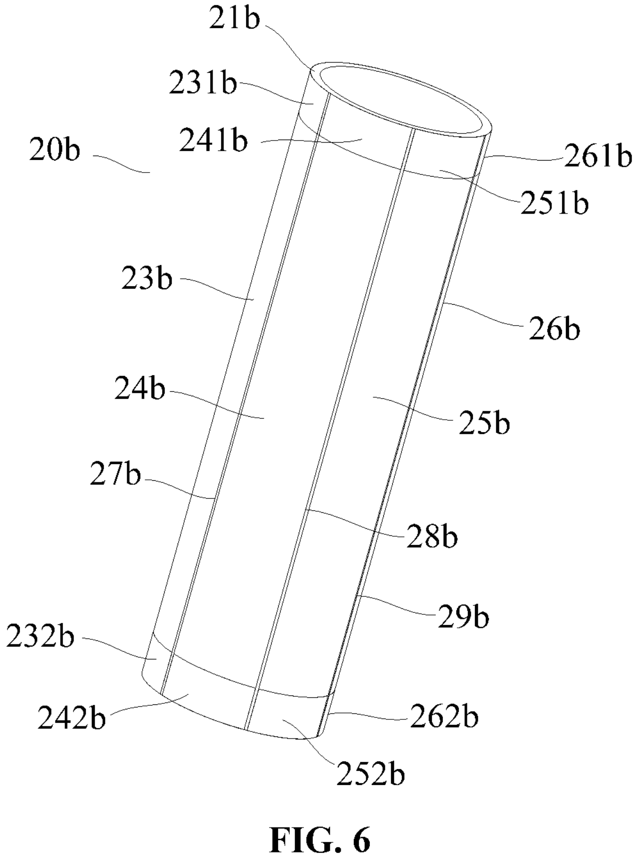
FIG. 6 is a schematic view of yet another embodiment of the infrared emitter of FIG. 2.

In a further preferred embodiment, the construction of the infrared emitter **20*b* can be seen in FIG. 6, the outer surface of the tubular substrate 21*b* comprises at least a first infrared emission coating 23*b*, a second infrared emission coating 24*b*, a third infrared emission coating 25*b* and a fourth infrared emission coating 26*b* which are arranged at intervals in a circumferential direction; and a first gap 27*b*, a second gap 28*b*, and a third gap 29*b*** therebetween.

At the same time, in order to operate them independently, the infrared emitter **20*b* further comprises conductive coatings respectively formed at two ends of the substrate 21*b* and partially coinciding with them so as to be conductive, the conductive coatings extending in the circumferential direction of the chamber 22; the conductive coatings include a first conductive coating 231*b*, a second conductive coating 232*b* located at both ends of the first infrared emission coating 23*b*, and a third conductive coating 241*b*, a fourth conductive coating 242*b*, the first conductive coating 231*b* and the second conductive coating 232*b*, and the third conductive coating 241*b* and the fourth conductive coating 242*b* located at both ends of the second infrared emission coating 24*b* are oppositely arranged in the axial direction of the chamber 22. Specifically, the first infrared emission coating 23*b* is coupled between the first conductive coating 231*b* and the second conductive coating 232*b* in the axial direction of the chamber 22 to radiate infrared rays toward the chamber 22 when the first conductive coating 231*b* and the second conductive coating 232*b* are energized; the second infrared emission coating 24*b* is coupled between the third conductive coating 241*b* and the fourth conductive coating 242***b* in the axial direction of the chamber 22 to radiate infrared rays toward the chamber 22 when the third conductive coating 241*b* and the fourth conductive coating 242*b* are energized.

Further, the conductive coating further comprises a fifth conductive coating 251*b* and a sixth conductive coating 252*b* at both ends of the third infrared emission coating 25*b*, and a seventh conductive coating 261*b* and an eighth conductive coating 262*b* at both ends of the fourth infrared emission coating 26*b*. The fifth conductive coating 251*b*, the sixth conductive coating 252*b*, the seventh conductive coating 261*b* and the eighth conductive coating 262*b* may be connected to the positive and negative poles of the electric core 14, respectively, so as to independently supply power to the infrared emission coating and thereby heat the portion of the smokable material A in an embodiment.

Or according to the above-mentioned FIG. 6, in other alternative embodiments, the first conductive coating 231*b*, the third conductive coating 241*b*, the fifth conductive coating 251*b* and the seventh conductive coating 261*b* can be seamlessly joined so as to form a continuous conductive whole, and then the whole can constitute an annular shape located on the outer surface of the upper end of the substrate 21*b*, and is partially overlapped and conductive with all the infrared emission coatings; while the corresponding second conductive coating 232*b*, the fourth conductive coating 242*b*, the sixth conductive coating 252*b* and the eighth conductive coating 262*b* are still separated independently, and in use, can be respectively connected to the positive and negative electrodes of the electric core 14 so as to independently supply power to the infrared emission coating.

Figure 7:
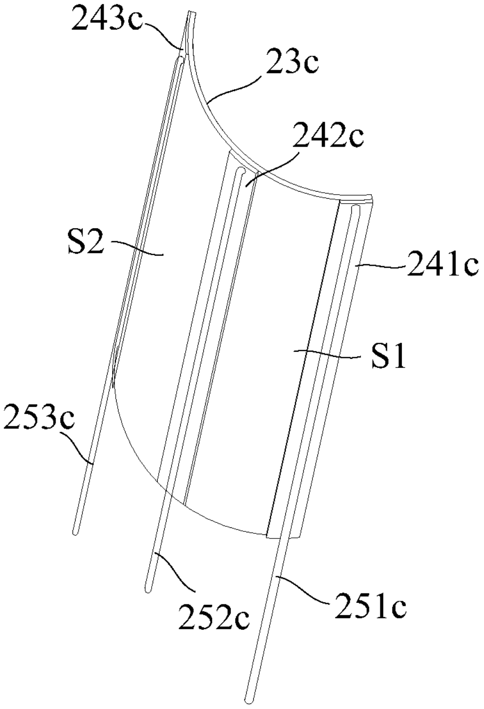
FIG. 7 is a schematic view of an infrared emission film according to an embodiment.

Further, in yet another preferred embodiment, the infrared emitter 20*c* includes an infrared emission film 23*c* that is constructed from a film material. With particular reference to FIG. 7, the infrared emission film 23*c* is an electroactive infrared emission film; the material can use a zinc oxide film with an infrared emission function, a rare earth element-doped indium tin oxide film, a graphene film, etc. and the thickness thereof is generally about 30-500 nm.

In order to facilitate power supply to the infrared emission film 23*c*, a conductive coatings 241*c*/242*c*/243*c* used as an electrode is formed on the infrared emission film 23*c*, and the material may be a low-resistivity metal or alloy, such as silver, gold, palladium, platinum, copper, nickel, molybdenum, tungsten, niobium or the above-mentioned metal alloy material. Meanwhile, in order to facilitate the subsequent conductive coatings 241*c*/242*c*/243*c* to be used as an electrode and to be electrically connected to the positive and negative electrodes of the electric core 14, an elongated conductive pins 251*c*/252*c*/253*c* is formed on the further conductive coatings 241*c*/242*c*/243*c* by welding or the like.

Figure 8:
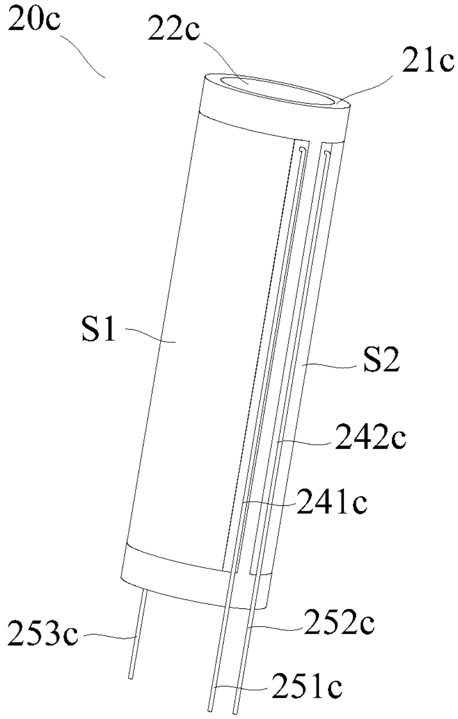
FIG. 8 is a schematic view of an infrared emitter formed from the infrared emission film of FIG. 7.

Further, in use, the infrared emission film 23*c* shown in FIG. 7 above is wound around the surface of the tubular substrate 21*c*. As shown in FIG. 8, the substrate 21*c* serves to provide immobilization and support for the infrared emission film 23*c*. In use, the first conductive pin 251*c* and the second conductive pin 252*c* can be respectively conductively connected to the positive and negative electrodes of the electric core 14 independently, or the second conductive pin 252*c* and the third conductive pin 253*c* can be conductively connected to the positive and negative electrodes of the electric core 14, and then the first infrared emission region S1 or the second infrared emission region S2 can be powered independently; in use, the infrared ray may be radiated separately or simultaneously to heat a portion or the whole of the smokable material A received in the interior chamber 22*c* of the substrate 21*c*.

Figure 9:
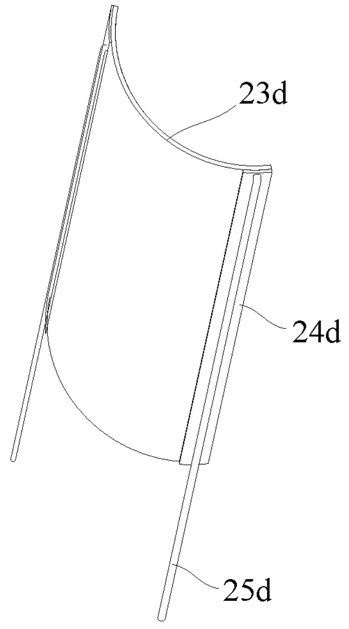
FIG. 9 is a schematic view of an infrared emission film according to still another embodiment.

Alternatively, in a further variant of embodiment, at least two infrared emission films 23*d* as shown in FIG. 9 may be used, conductive coatings 24*d* and conductive pins 25*d* are respectively provided at two ends thereof, and are successively attached or wound on the outer surface of the substrate 21 in a circumferential direction, and in an independent power supply, the positive and negative electrodes of the electric core 14 are respectively connected via the respective conductive pins 25*d* of the infrared emission films 23*d*, so that the power supply can be independent without the need for a common pin.

Alternatively, in a more preferred embodiment, the conductive coating of the above infrared emission films 23*c*/23*d* may also be formed and arranged in a circumferentially printed manner as shown in FIG. 6.

Figure 10:
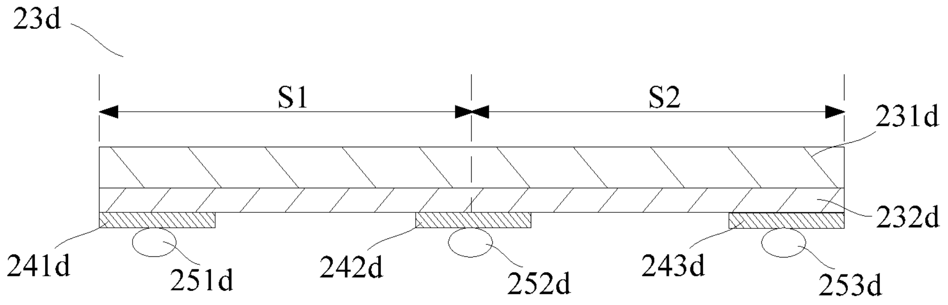
FIG. 10 is a schematic view of an infrared emission film according to still another embodiment.

In addition to the infrared emission film prepared using the above single infrared emission film material, or in yet another preferred embodiment, a structure comprising multiple layers is prepared as shown in FIG. 10, comprising:

a flexible substrate base 231*d*, and an infrared emission layer 232*d* formed on the flexible substrate base 231*d;* the first conductive coating 241*d*, the second conductive coating 242*d*, the third conductive coating 243*d*, the first conductive coating 241*d*, the second conductive coating 242*d*, and the third conductive coating 243*d* formed at both side ends and the central position of the infrared emission layer 232*d* in the width direction respectively extend in the axial direction of the chamber 22. The first conductive coating 241*d*, the second conductive coating 242*d* and the third conductive coating 243*d* are sequentially distributed along the circumferential direction of the chamber 22, thereby dividing the infrared emission film 23*c* into the first infrared emission region S1 between the first conductive coating 241*d* and the second conductive coating 242*d* and the second infrared emission region S2 between the second conductive coating 242*d* and the third conductive coating 243*d.*

Further, a first conductive pin 251*d*, a second conductive pin 252*d* and a third conductive pin 253*d* are provided on the infrared emission layer 232*d*, and the distribution of the first conductive pin 251*d*, the second conductive pin 252*d* and the third conductive pin 253*d* is formed by welding, etc. Wherein the first infrared emission region S1 is located between the first conductive pin 251*d* and the second conductive pin 252*d*, and the second infrared emission region S2 is located between the second conductive pin 252*d* and the third conductive pin 253*d.*

In the preferred embodiment shown in FIG. 10, the infrared emission film 23*d* can have a more diverse material selection and preparation quality, and the specific flexible substrate base 231*d* serves as a substrate for subsequent loading of the infrared emission material and can facilitate subsequent preparation of the flexible material wound around the outer surface of the substrate 21; the selected material may be flexible glass, PI film, flexible ceramic paper, etc.;

The infrared emission layer 232*d* can be formed on the surface of the flexible substrate base material 231*d* by a process such as printing or deposition, and in particular, the infrared emission layer 232*d* can be obtained by depositing and curing a material capable of emitting infrared rays on the surface of the flexible substrate base material 231*d* by means of spraying, or doctor blade coating, spin coating, roller coating, physical or chemical vapor deposition, etc. in the embodiment; in an embodiment, the material of the infrared emission layer 232*d* may include an oxide composition of at least one metal element such as Mg, Al, Ti, Zr, Mn, Fe, Co, Ni, Cu, Cr, Zn, etc. which radiates far infrared rays having a heating effect when heated to an appropriate temperature, and the thickness may be preferably controlled to be 30 to 50 μm.

Figure 11:
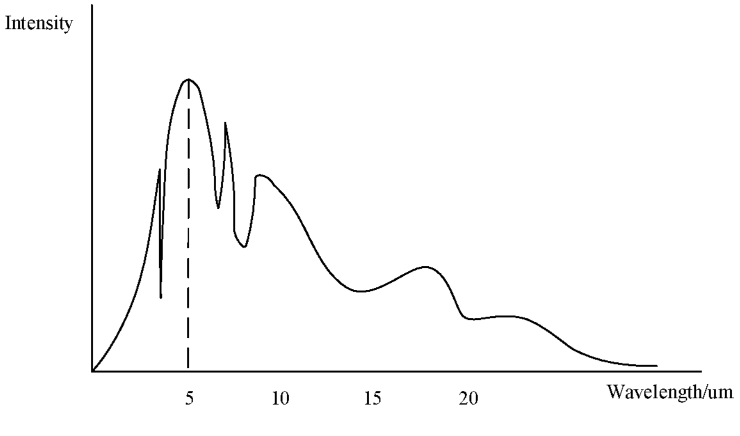
FIG. 11 is an emission spectrum of infrared rays emitted from a first region as set forth in one embodiment.
Figure 12:
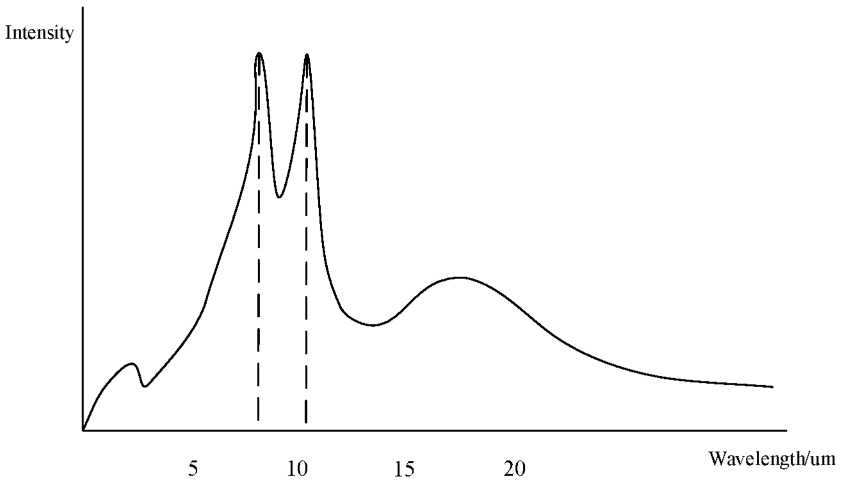
FIG. 12 is an emission spectrum of infrared rays emitted from a second region proposed in one embodiment.

Further, in a preferred embodiment, the first infrared emission region S1 has a different wavelength and efficiency of infrared emission than the second infrared emission region S2. The specific smokable material A contains different organic components, and each of these different organic components has a different optimal infrared absorption wavelength; for example, nicotine in smokable material A has an optimum infrared absorption wavelength that is different from that of the aerosol forming humectant glycerin and vegetable glycerin. Thus, in an embodiment, it is preferred that the first infrared emission region S1 and the second infrared emission region S2 each emit an emission spectrum for the above different components, although the peak wavelength ranges of the respective emission spectra are different, in order to balance the heating efficiency of the various organic components. For example, FIGS. 11 and 12 respectively show infrared emission spectra of a first infrared emission region S1 and a second infrared emission region S2 respectively radiated when the temperature of the first infrared emission region S1 and the second infrared emission region S2 increases to a certain temperature after power supply; it can be seen from FIGS. 11 and 12 that the respective emission spectra of the first infrared emission region S1 and the second infrared emission region S2 have different WLP (peak wavelength, corresponding wavelength at the maximum radiation power), which can respectively be adapted to the optimum absorption wavelength range of different organic components in the smokable material A. That is, the first infrared emission region S1 and the second infrared emission region S2 have different infrared emission spectra, and the infrared emission spectrum of the first infrared emission region S1 has a different peak wavelength from the infrared emission spectrum of the second infrared emission region S2.

Figure 13:
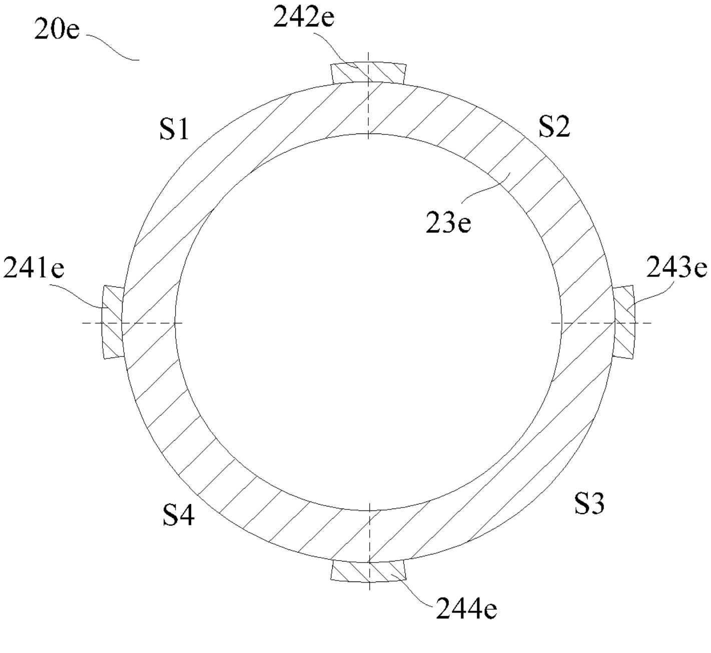
FIG. 13 is a schematic view of an infrared emitter according to yet another embodiment.

In yet another alternative embodiment, in order to operate simultaneously on a portion or several of the infrared emission regions at the same time, the pins corresponding to the IR emitting required to operate may simply be connected to the positive and negative poles of the electric core 14. Further, when the number of infrared emission regions to be operated is relatively large, such as the infrared emitter **20*b* having four infrared emission regions shown in FIG. 6, in order to reduce the operation of all independent connections; in a preferred embodiment, an infrared emitter 20*e* is also proposed, as shown in FIG. 13, by forming an infrared emission coating 23*e* on the outer surface of a tubular substrate 21*e*, and printing a first conductive coating 241*e*, a second conductive coating 242*e*, a third conductive coating 243*e* and a fourth conductive coating 244*e* extending in an axial direction; the infrared emission coating 23*e* is further divided into a first infrared emission region S1, a second infrared emission region S2, a third infrared emission region S3, and a fourth infrared emission region S4 shown in FIG. 13**.

Figure 14:
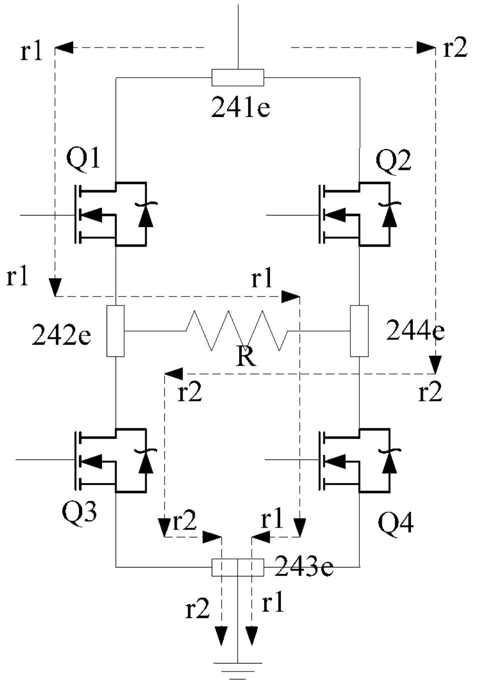
FIG. 14 is a schematic configuration diagram of a control circuit according to one embodiment.

Accordingly, in the operation control, in the manner shown in FIG. 14, the first conductive coating **241*e*, the second conductive coating 242*e*, the third conductive coating 243*e* and the fourth conductive coating 244*e*** can be connected a bridge or full-bridge circuit composed of four N-MOS tubes via conductive pins, and the bridge or full-bridge circuit is coupled to the first infrared emission region and second infrared emission region. The full-bridge circuit includes a transistor configured to alternately turn on and off to form a first current alternately supplied to the first infrared emission region and a second current supplied to the second infrared emission region to alternately activate the first infrared emission region and the second infrared emission region.

Of course, a current limiting protection resistor R is added to the embodiment. Specifically according to the bridge structure shown in FIG. 14, a connection end of the first conductive coating **241*e* is connected to the positive electrode Vin+ of the electric core 14 as a voltage input end, and a connection end of the third conductive coating 243*e* is grounded; in the control process, when Q1 and Q4 are controlled to be on at the same time and Q2 and Q3 are controlled to be off via a MCU controller, etc. a current in the direction indicated by an arrow r1 in FIG. 14 is formed, and then a first infrared emission region S1 powered by a first conductive coating 241*e* and a second conductive coating 242*e* and a third infrared emission region S3 powered by a third conductive coating 243*e* and a fourth conductive coating 244*e* are operated at this moment; when the on-off state of the bridge changes to Q2 and Q3 being on at the same time, and Q1 and Q4 being off, an electric current is formed in the direction indicated by the arrow r2, and then the fourth infrared emission region S4 powered by the first conductive coating 241*e* and the fourth conductive coating 244*e* and the third infrared emission region S3 powered by the second conductive coating 242*e* and the third conductive coating 243*e* are operated at this time. Further, the operation of each region is carried out in the above manner of constructing the bridge so as to realize the radiation of different regions of the smokable material A to realize the partial heating. Of course, based on the above embodiment, to ensure that a bridge can be constructed, it may be necessary to solder multiple conductive pins on the above conductive coatings 241*e*/242*e*/243*e*/244*e* to ensure that the bridge shown in FIG. 14** can be accessed.

Figure 15:
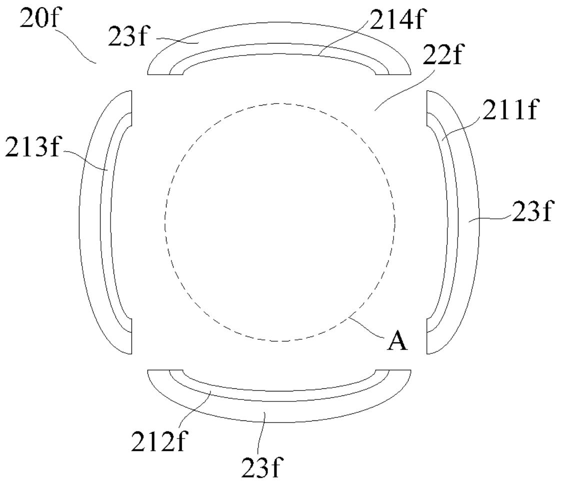
FIG. 15 is a schematic view of an infrared emitter according to yet another embodiment.

In yet another alternative embodiment of the invention, the different infrared emission regions may be separately formed on separate substrates; in one embodiment, reference is made to FIG. 15.

In the present embodiment, the substrate **21*f* is provided in separate parts, and the substrate 21*f* includes four separate parts, respectively, a first substrate 211*f*, a second substrate 212*f*, a third substrate 213*f* and a fourth substrate 214*f* provided around the chamber 22*f*. The first substrate 211*f*, the second substrate 212*f*, the third substrate 213*f* and the fourth substrate 214*f* are respectively in the form of an arc-shaped sheet structure bending outward in the radial direction of the chamber 22*f*, and the first substrate 211*f*, the second substrate 212*f*, the third substrate 213*f* and the fourth substrate 214*f* are successively connected and enclosed to form the chamber 22*f*. Here, the radially outward direction along the chamber 22*f* is a direction away from the chamber 22*f***.

The first substrate **211*f*, the second substrate 212*f*, the third substrate 213*f* and the fourth substrate 214*f* are respectively formed with an infrared emission coating or a wound infrared emission film 23*f*; each may be independently activated by means of independent control as described above to heat different regions of the smokable material A received in the chamber 22*f***.

It will be appreciated that in other embodiments the separately provided substrate **21*f*** may comprise only two separate parts, a first substrate and a second substrate respectively provided around the chamber. The first substrate and the second substrate are respectively in an arc-shaped sheet-like structure bent outward in the radial direction of the chamber, and two ends of the first substrate and two ends of the second substrate are connected and enclose to form the chamber. Further, a first infrared emission coating is provided on the first substrate, at least a portion of the first infrared emission coating forms the first infrared emission region; a second infrared emission coating is disposed on the second substrate, at least a portion of the second infrared emission coating forms the second infrared emission region.

Figure 16:
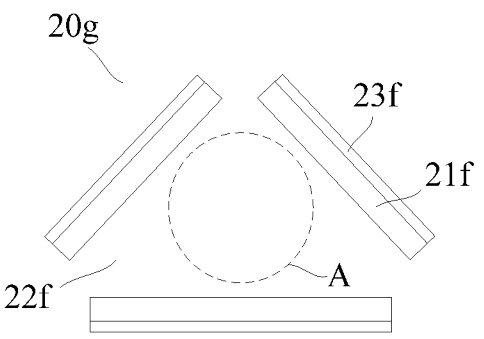
FIG. 16 is a schematic diagram of an infrared emitter according to yet another embodiment.

Alternatively or in an alternative embodiment, as shown in FIG. 16, the infrared emitter 20*g* may include:

At least two discrete pieces of substrate 21*g*, such as the number preferably shown in FIG. 15 is 3.

An infrared emission coating 23*g* is formed on each discrete sheet-like substrate 21*g* to heat different regions of the smokable material A received in the chamber 22*g*.

It should be noted that the description of the present invention and the accompanying drawings illustrate preferred embodiments of the present invention, but are not limited to the embodiments described herein. Further, those skilled in the art will be able to make modifications and variations based on the above teachings. All such modifications and variations are intended to be within the scope of the appended claims.

What is claimed is:

1. An aerosol-generating device for heating a smokable material to generate an aerosol for inhalation, comprising:

a chamber for receiving a smokable material; and an infrared emitter configured to radiate infrared rays toward the chamber to heat the smokable material;

wherein the infrared emitter comprises;

at least one first infrared emission region and at least one second infrared emission region arranged in sequence along a circumferential direction of the chamber; wherein the first infrared emission region and the second infrared emission region are configured to be independently activatable so as to independently radiate infrared rays to heat different portions of the smokable material; and a substrate configured to surround a periphery of the chamber; and wherein the first infrared emission region and the second infrared emission region are successively disposed on a substrate surface along the circumferential direction of the chamber for heating the smokable material received in the chamber.

2. The aerosol-generating device of claim 1, wherein the first infrared emission region and the second infrared emission region are separate from each other.

3. The aerosol-generating device of claim 1, wherein the infrared emitter comprises:

a first infrared emission layer and a second infrared emission layer successively bonded to the substrate surface along the circumferential direction of the chamber; and wherein at least a portion of the first infrared emission layer forms the first infrared emission region and at least a portion of the second infrared emission layer forms the second infrared emission region.

4. The aerosol-generating device of claim 3, wherein the substrate comprises an inner surface and an outer surface;

wherein the first infrared emission layer and the second infrared emission layer are both located on an inner surface of the substrate or are both located on an outer surface of the substrate.

5. The aerosol-generating device of claim 3, wherein the first infrared emission layer is a coating formed on the substrate or a film bonded to the substrate; and/or the second infrared emission layer is a coating formed on the substrate or a thin film bonded to the substrate.

6. The aerosol-generating device of claim 3, wherein the infrared emitter further comprises a conductive element for powering the first and second infrared emission layers.

7. The aerosol-generating device of claim 6, wherein the conductive element is a conductive coating formed on the substrate.

8. The aerosol-generating device of claim 7, wherein the conductive coating at least partially overlaps the first and second infrared emission layers, thereby forming a conductive connection with the first and second infrared emission layers.

9. The aerosol-generating device of claim 6, wherein the conductive element is configured to extend in an axial direction of the chamber.

10. The aerosol-generating device of claim 9, wherein the conductive element comprises a first conductive element, a second conductive element, and a third conductive element spaced along the circumferential direction of the chamber;

the first infrared emission layer is coupled between the first conductive element and the second conductive element to radiate infrared rays toward the chamber when the first conductive element and the second conductive element are energized; and the second infrared emission layer is coupled between the second and third conductive elements to radiate infrared rays toward the chamber when the second and third conductive elements are energized.

11. The aerosol-generating device of claim 6, wherein the conductive element is configured to extend in the circumferential direction of the chamber.

12. The aerosol-generating device of claim 11, wherein the conductive element comprises a first conductive element and a second conductive element, and a third conductive element and a fourth conductive element opposite in an axial direction of the chamber;

the first infrared emission layer is coupled between a first conductive element and a second conductive element in the axial direction of the chamber to radiate infrared rays toward the chamber when the first conductive element and the second conductive element are energized; and the second infrared emission layer is coupled between the third conductive element and the fourth conductive element in the axial direction of the chamber to radiate infrared rays toward the chamber when the third conductive element and the fourth conductive element are energized.

13. The aerosol-generating device of claim 6, wherein the substrate comprises a first end and a second end opposite in an axial direction of the chamber; wherein the conductive element is configured to extend in the circumferential direction of the chamber;

the conductive element comprises a first conductive element disposed at the first end, a second conductive element and a third conductive element disposed at the second end;

the first conductive element includes a first portion opposite the second conductive element in the axial direction of the chamber, and a second portion opposite the third conductive element;

the first infrared emission layer is coupled between the first portion and the second conductive element in the axial direction of the chamber to radiate infrared rays toward the chamber when the first portion and the second conductive element are energized; and the second infrared emission layer is coupled between the second portion and the third conductive element in the axial direction of the chamber to radiate infrared rays toward the chamber when the second portion and the third conductive element are energized.

14. The aerosol-generating device of claim 3, wherein the first infrared emission layer and the second infrared emission layer do not completely cover the substrate surface, and a blank region between the first infrared emission layer and the second infrared emission layer in the circumferential direction of the chamber is formed on the substrate surface.

15. The aerosol-generating device of claim 1, wherein the infrared emitter comprises:

an infrared emission film provided on the substrate surface, wherein a first conductive coating, a second conductive coating and a third conductive coating extending along an axial direction of the chamber are formed on the infrared emission film; and wherein the first conductive coating, the second conductive coating and the third conductive coating are successively arranged along the circumferential direction of the chamber, so as to divide the infrared emission film into the first infrared emission region located between the first conductive coating and the second conductive coating and the second infrared emission region located between the second conductive coating and the third conductive coating.

16. The aerosol-generating device of claim 1, wherein the infrared emitter comprises at least:

a first substrate and a second substrate disposed about the chamber; and wherein the first substrate is provided with a first infrared emission layer, and the second substrate is provided with a second infrared emission layer; and at least a portion of the first infrared emission layer forms the first infrared emission region and at least a portion of the second infrared emission layer forms the second infrared emission region.

17. The aerosol-generating device of claim 16, wherein the first substrate and/or the second substrate are configured in an arc that curves in a direction away from the chamber;

and/or the first substrate and/or the second substrate are configured as a sheet.

18. The aerosol-generating device of claim 1, wherein the infrared emitter further comprises a third infrared emission region and a fourth infrared emission region;

wherein the first infrared emission region and the third infrared emission region are oppositely arranged along a radial direction of the chamber; and wherein the second infrared emission region and the fourth infrared emission region are oppositely disposed in the radial direction of the chamber.

19. The aerosol-generating device of claim 1, wherein the infrared emitter further comprises more than one conductive elements for powering the first infrared emission layer and the second infrared emission layer; and wherein the more than one conductive elements are spaced along the circumferential direction of the chamber.

20. An infrared emitter for an aerosol-generating device, wherein the infrared emitter is formed into a tubular shape extending in a length direction and comprises:

a first infrared emission region and a second infrared emission region arranged in succession in a circumferential direction; wherein the first infrared emission region and the second infrared emission region are independently activatable to independently radiate infrared rays to heat different portions of smokable material; and a substrate configured to surround a periphery of a chamber for receiving the smokable material; and wherein the first infrared emission region and the second infrared emission region are successively disposed on a substrate surface along the circumferential direction of the chamber for heating the smokable material received in the chamber.

* * * * *